(12) United States Patent
Keefe

(10) Patent No.: US 6,357,645 B1
(45) Date of Patent: Mar. 19, 2002

(54) RELEASE PULL BAR HOLSTER

(76) Inventor: David Keefe, 21 Merganser Avenue, Timberlea, N.S. (CA), B3T 1J1

( * ) Notice: Subject to any disclaimer, the term of this patent is extended or adjusted under 35 U.S.C. 154(b) by 0 days.

(21) Appl. No.: 09/636,074

(22) Filed: Aug. 10, 2000

(30) Foreign Application Priority Data

Aug. 13, 1999 (CA) .............................................. 2278999

(51) Int. Cl.$^7$ .......................... B60R 11/06; B60R 11/00
(52) U.S. Cl. ....................... 224/567; 224/400; 224/545; 224/566; 211/70.6
(58) Field of Search ................................. 224/400, 545, 224/548, 565, 566, 569, 245, 251, 915, 935, 567; 211/62, 70.2, 70.6

(56) References Cited

U.S. PATENT DOCUMENTS

| | | | |
|---|---|---|---|
| 988,485 A | * | 4/1911 | Mitchell |
| 1,756,677 A | * | 4/1930 | Cook |
| 2,815,863 A | * | 12/1957 | Larson |
| 4,364,499 A | * | 12/1982 | McCue |
| 4,378,888 A | * | 4/1983 | Reed ....................... 224/915 X |
| 4,795,067 A | * | 1/1989 | Hamilton .................. 224/915 X |
| 5,046,622 A | * | 9/1991 | Wood ...................... 224/915 X |
| 5,288,000 A | * | 2/1994 | Adamson |
| 5,363,957 A | | 11/1994 | Reichner |
| 5,435,473 A | * | 7/1995 | Larkum ....................... 224/569 |
| 5,460,306 A | * | 10/1995 | Rudd ...................... 224/569 X |
| 5,615,815 A | * | 4/1997 | Hogan ..................... 224/545 X |
| 5,829,604 A | * | 11/1998 | Brophy ....................... 211/70.2 |
| 6,129,252 A | * | 10/2000 | Jackson et al. ........... 224/545 X |
| 6,149,181 A | * | 11/2000 | Biederman |

FOREIGN PATENT DOCUMENTS

| | | |
|---|---|---|
| CA | 1212926 | 10/1986 |
| CA | 2083300 | 5/1994 |
| CA | 2235009 | 5/1997 |

* cited by examiner

Primary Examiner—Gregory M. Vidovich
(74) Attorney, Agent, or Firm—Rosenman & Colin, LLP

(57) ABSTRACT

A storage holster designed to securely contain and provide easy access to a release pull bar that is used for unlocking a fifth wheel assembly of a transport truck. The holster comprises an elongated rectangular plate with a carrier projecting from one side of the plate. The carrier receives and supports a release pull bar and has an open end which commences at a point midway along the longitudinal axis of the plate. The closed end of the carrier terminates at the distal end of the plate and is provided with one or more holes to permit drainage of grease or oil that may be coated on a pull bar following use thereof. A pin, inserted through a hole in both the carrier and plate, works in combination with a padlock to function as a security and safety device to prevent the pull bar from being removed without authorization, or from maneuvering out of position when the truck is in transit. Connected near the proximal end and on the same side of the plate is a narrow rectangular collar lined with a rubber grommet. The collar helps to stabilize the position of a release pull bar during storage and prevents it from vibrating in the holster during transit. The invention also provides a means with which to attach the holster to a support surface of the truck, generally in an upwardly angled orientation to permit insertion and retention of a pull bar.

12 Claims, 5 Drawing Sheets

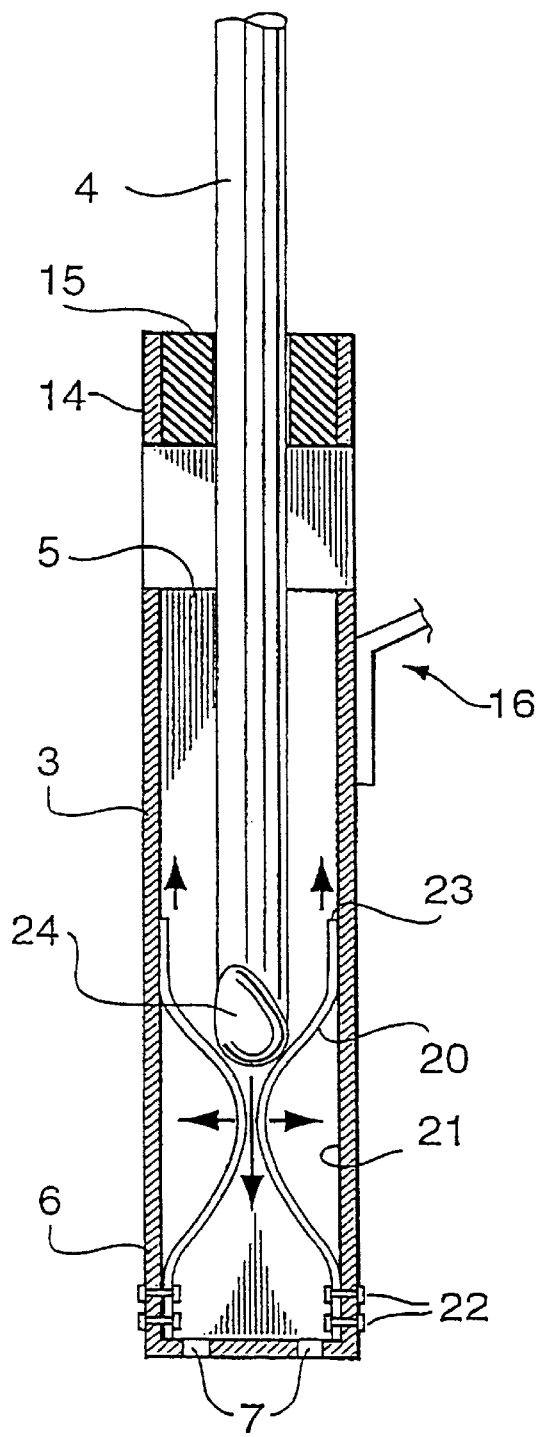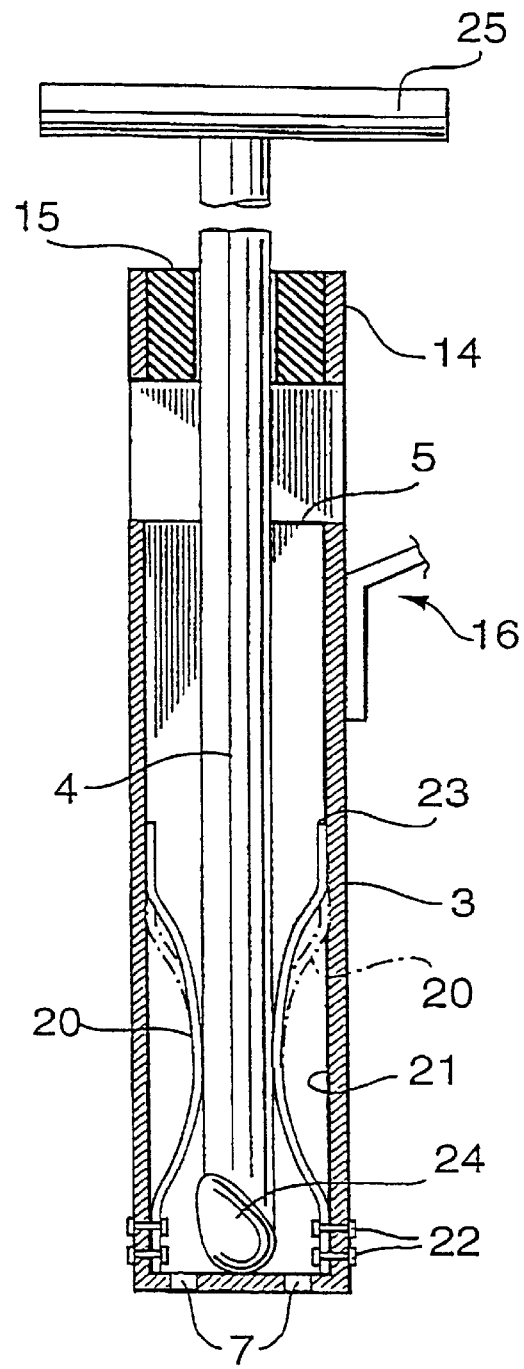
FIG. 4A  FIG. 4B

RELEASE PULL BAR HOLSTER

FIELD OF INVENTION

The present invention relates to a storage holster that is securable to a support surface of a vehicle and which can safely and securely contain a release pull bar when it is not being used to decouple a tractor from a trailer by disengaging the locking mechanism of a fifth wheel assembly. The invention is particularly useful to a driver of a transport truck who requires a means for conveniently and safely storing a release pull bar when the truck is in transit.

BACKGROUND OF THE INVENTION

A release pull bar is a specialty decoupling tool frequently used by a driver of a transport truck to disengage a tractor and trailer that are connected together by a locking mechanism of a fifth wheel assembly. Because the fifth wheel locking mechanism and assembly are located underneath the truck, a driver must use a release pull bar as an aid to gain access to the area without having to crawl under the front of the trailer within the vicinity of the wheels. The bar is of sufficient length which allows the driver to safely reach a release handle located on the side of the locking mechanism whenever it is necessary to unlock and subsequently disengage the trailer from the tractor. In general, the release pull bar is an elongated cylindrical metal rod which has a diameter of about ½ inch and a length of approximately 3 feet. Located at the proximal end of the pull bar is a T-shaped handle which allows the bar to be conveniently and easily grasped, while the distal end of the bar terminates in a hook-shaped member. The driver manipulates the release pull bar in order to reach the release handle located at the side of the fifth wheel locking mechanism. Once the hook-shaped member of the bar has properly latched onto the release handle of the locking mechanism, the tractor and trailer are eventually disengaged from one another following the application of a pulling force by the driver.

After the driver has subsequently completed the operation described above, the release pull bar must be placed and stored in the tractor, which has traditionally occurred in a number of different places that are often inconvenient and not well suited for this purpose. Routinely, some of these temporary storage places have been located behind the driver's seat, in the sleeper compartment, on the rear deck plate, and in the grate of the deck plate behind the cab, to name a few. Unfortunately, all of these storage places are inconvenient for readily retrieving the pull bar and often pose a potential safety threat to the driver and the operation of the vehicle.

For instance, grease or oil which may coat the distal end of the release pull bar, often drips and accumulates onto the floor of the cab over time when the pull bar is not in use. This creates an unwanted and potentially hazardous mess for the driver if the grease or oil happens to pass onto the soles of the driver's shoes and/or the surface of a brake or clutch pedal eventually leading to slippage and lack of driving control.

Alternatively, placing the release pull bar on the rear deck plate, or in the grate of the deck plate, can also generate a potentially dangerous situation. This is because the air hose coupling, which connects the trailer to the tractor, and/or the electrical supply cord, can become entangled around the release pull bar creating a risk to the driver and those persons driving within the vicinity of the truck. For example, if the air hose becomes damaged or disconnected as a result of being entangled around the release pull bar, the tractor can suddenly lose air pressure. This will either cause the emergency brakes to engage automatically or the trailer brakes to suddenly lock, which is referred to as an automatic lock-up. Moreover, if the electrical cord becomes entangled around the release pull bar, a loss of power supply to the trailer could result in an electrical short and a subsequent fire hazard, or a malfunctioning of the trailer lights. In either case, this poses a considerable safety risk to the driver and those driving near him.

In-addition, placement of the release pull bar in the grate of the deck plate behind the cab can occasionally pose an inconvenience to the driver by temporarily impeding access to the refrigeration unit located on the front of the trailer, behind the cab.

In view of the foregoing disadvantages inherent with the options currently available to a driver when storing a release pull bar in a transport truck, the present invention seeks to provide a storage holster specifically designed and constructed for this purpose.

SUMMARY OF THE INVENTION

Accordingly, a principal object of the present invention is to provide a storage holster to safely and securely contain a release pull bar and which has several advantages and novel features.

Another object of the present invention is to provide a storage holster for use in a transport truck which is especially adapted for receiving and storing a release pull bar, including means for firmly supporting and stabilizing the pull bar within the holster.

Still another object of the present invention to provide a release pull bar holster of durable and reliable construction which may be easily and efficiently manufactured.

According to the invention, there is provided a holster for storing a release pull bar for use in a transport truck, comprising in combination:

(a) a carrier member for receiving and supporting a release pull bar;

(b) mounting means disposed on one side of the carrier member, said mounting means being adapted for attachment to a support surface of a transport truck;

(c) securing means interior of the carrier member for supporting and stabilizing a release pull bar therein while the transport truck is in transit; and (d) collar means located near the proximal end of the holster for supporting the proximal end of a release pull bar.

Thus, the present invention provides a holster which has a customized design and structure for appropriately supporting a release pull bar in a safe and convenient location. The holster also securely restrains the release pull bar and makes it easily accessible by positioning the handle of the bar in an uppermost position such that it may be readily grasped and withdrawn for use by the driver. Furthermore, the invention provides a means to enable preferred attachment of the holster to a battery box or frame rail of a transport truck.

The holster is advantageously of an essentially rectangular profile consisting of an elongated plate with a carrier projecting from one side of the plate. The carrier is designed for receiving and supporting the distal end of a release pull bar and preferably has a length which is approximately one-half that of the plate. The proximal end of the carrier commences at a point midway along the longitudinal axis of the plate and is open ended. The closed end of the carrier terminates at the distal end of the plate and is provided with one or more holes to permit drainage of grease or oil that may be coated on a pull bar following use thereof.

In a preferred embodiment, there is located at a point approximately midway along the longitudinal axis of the lateral wall of the carrier and in direct alignment with the opposing wall (being the plate), a pair of holes. The holes have sufficient diameter to accommodate the insertion of a metal pin. Near the distal end of the pin is an aperture sized to cooperate with a padlock such that in combination, they constitute a locking means. Collectively, the locking means in use with the holster functions to hold the pull bar firmly within the holster and prevent unauthorized removal thereof, or possible maneuvering out of position when a truck is in transit.

Mounted within the internal cavity of the carrier near its distal end is a pair of compressible wave springs, of similar height to the carrier and extending approximately one-half the entire length of the carrier. The wave springs are positioned on mutually opposed inside lateral walls of the carrier with their convex surfaces facing inward. When the driver inserts a release pull bar through the open end of the carrier, the distal end of the release pull bar eventually begins to exert a downward compressive force on the wave springs as the pull bar moves in a forward direction. When the release pull bar is fully inserted inside the carrier, the collective expansive and compressive forces of the wave springs hold the pull bar securely in place.

A narrow rectangular collar of similar width and height to the carrier for supporting the proximal end of a release pull bar may be mounted near the proximal end and on the same side of the plate. A rubber grommet lining the interior of the collar conforms to the exterior profile of a pull bar. The rubber grommet ensures that the position of the pull bar is stabilized during storage thereby preventing it from vibrating in the holster when the truck is in transit.

One embodiment of the invention permits the holster to be mounted to the truck at a suitable angle of about 30 to 75°, preferably 45 to 60°, through the use of a flange. The flange has a first portion which is attached to and parallel with the anterior wall of the carrier near its proximal end. A second portion of the flange, which extends obliquely towards the first portion, has two holes to allow for attachment to a support surface.

An alternative means of attachment is provided for in another embodiment of the invention such that the elongated plate also serves as a universal mounting device for the holster. Accordingly, the height of the plate is somewhat larger than that of the carrier and extends an equal distance beyond the anterior and posterior sides of the holster. The universal mounting device has four elongated slots in a plane parallel to the longitudinal axis of the plate and equally positioned two to each side near the upper and lower edges of the device. The length of the slots allows for suitable positioning and secured attachment of the holster to a variety of support surfaces of the truck.

An alternative means of passage for insertion and removal of the release pull bar in the holster is provided for in a further embodiment the invention by the use of a hinged collar. The hinged collar is pivotally attached near the proximal end of the plate of the holster and may be positioned over the pull bar. Moreover, a security means, comprising a lock assembly and key, is incorporated in the hinged collar to prevent unauthorized removal thereof. A locking arm, attached to the lock assembly, may occupy a groove located inside the plate when the collar is positioned over the pull bar The locking arm may be rotated into the groove through the insertion and rotation of the key in the look assembly thereby retaining the hinged collar in position over the pull bar.

The preferred material from which the holster can be made is either aluminum or plastic. However, if the mounting means constitutes a flange, this should be manufactured from aluminum, or other suitable metal, only.

For a better understanding of the invention, its operating advantages and the specific objects attained by its uses, reference should be made to the accompanying drawings and descriptive matter in which there is illustrated preferred embodiments of the invention. In this regard, it is to be understood that the invention is not limited in its application to the details of construction and to the arrangements of the components set forth in the following description or illustrated in the drawings. The invention is capable of other embodiments of being practiced and carried out in various ways.

BRIEF DESCRIPTION OF THE DRAWINGS

In the following description, the invention will be explained in detail with the aid of the accompanying drawings which illustrate preferred embodiments of the present invention and in which;

FIGS. 4A and 4B are cross-sectional views of the release pull bar holster illustrating its functionality as the pull bar is being inserted and subsequently supported within the holster;

DESCRIPTION OF THE PREFERRED EMBODIMENTS

Figures 1, 2:
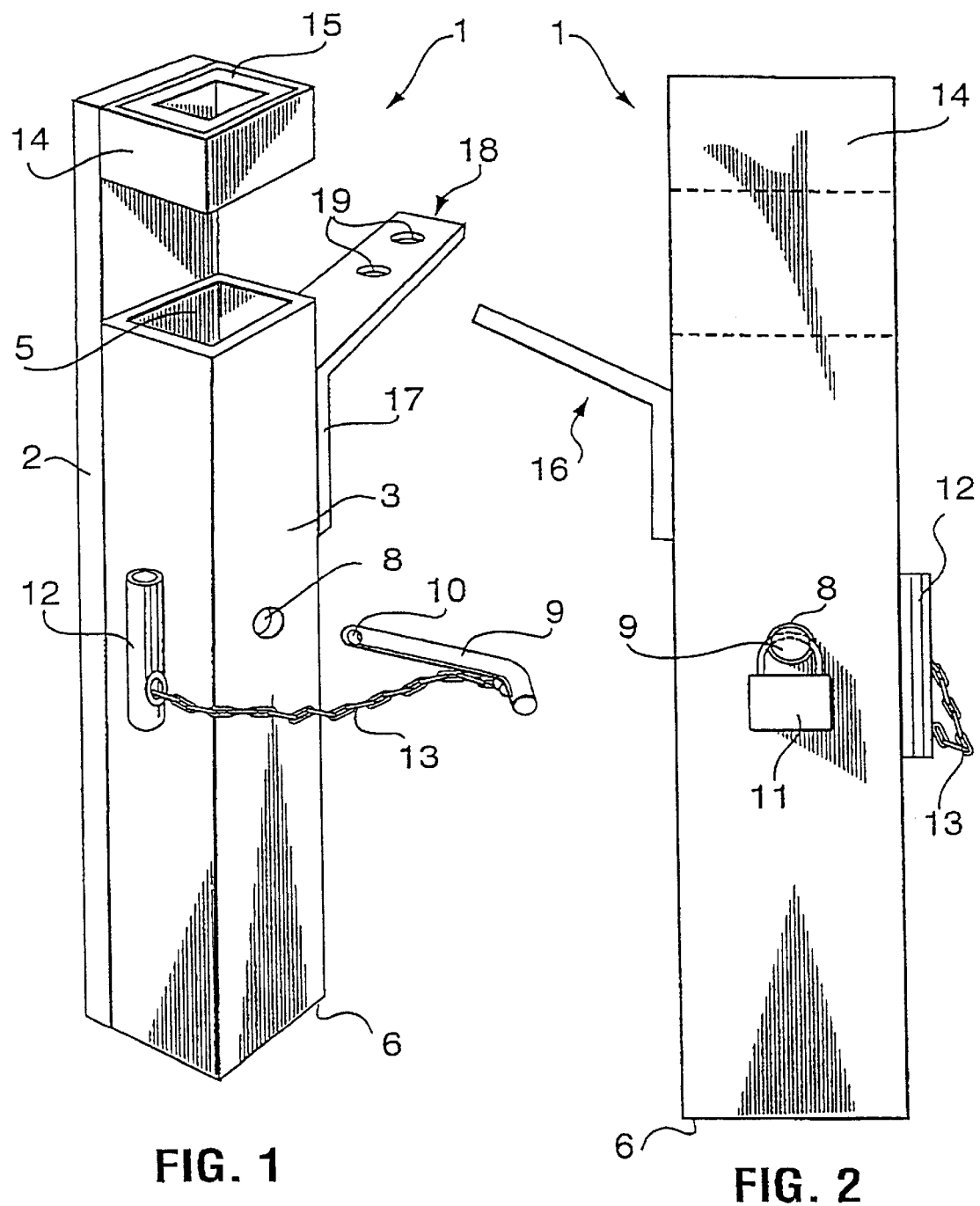
FIG. 1 shows a perspective view that illustrates a first embodiment of a release pull bar holster.
FIG. 2 shows a rear view of the release pull bar holster according to FIG. 1.
Figure 3:
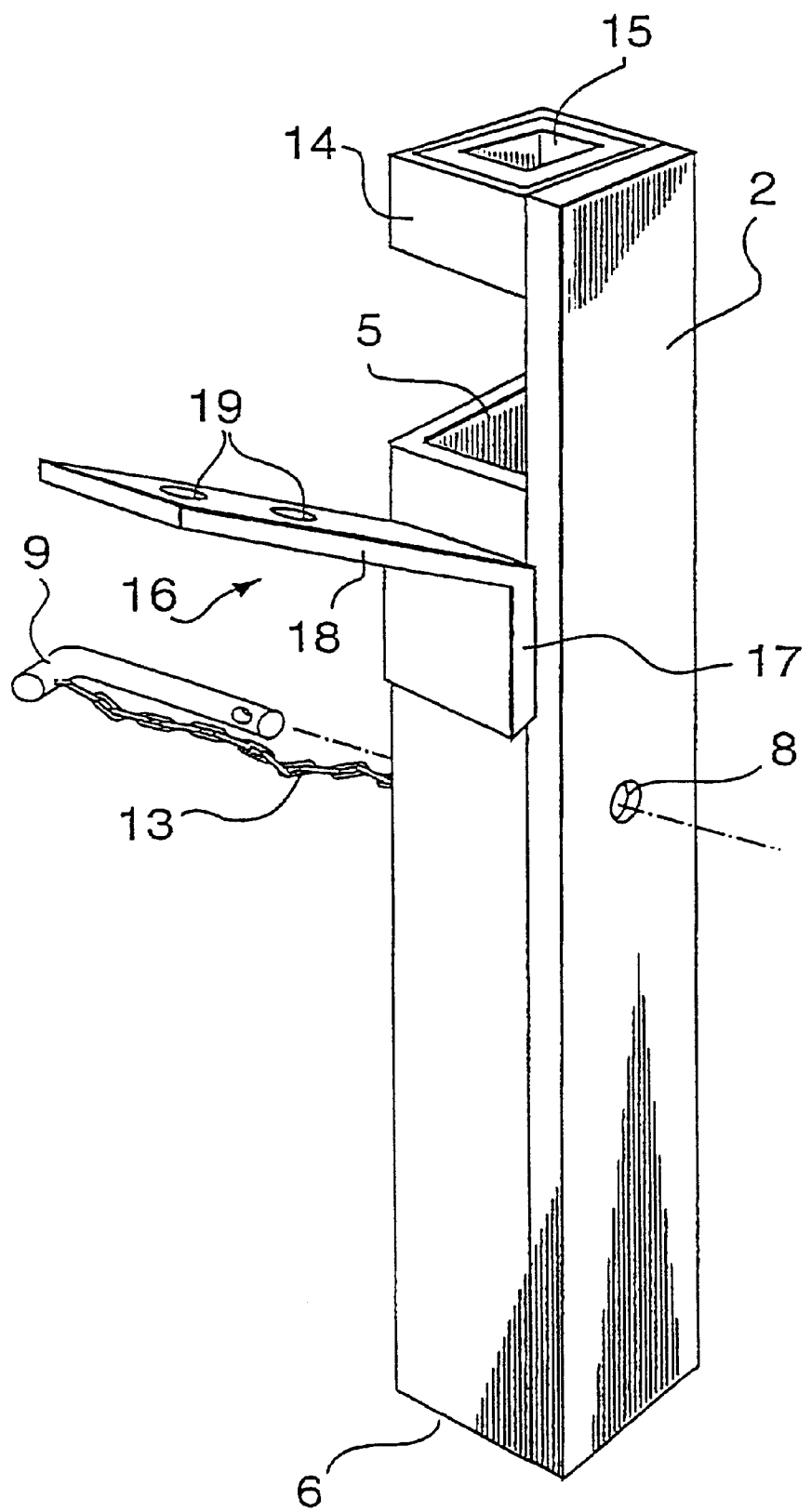
FIG. 3 shows an opposing side view of the release pull bar holster according to FIG. 1.

As illustrated in FIGS. 1 to 3, a first embodiment of a release pull bar holster 1 comprises an elongated rectangular plate 2 with a rectangular carrier 3 projecting from one side of the plate 2. The carrier 3 is designed for receiving and supporting the distal end of a release pull bar 4 (shown in FIGS. 4A and 4B) and has a length which is approximately three-quarters that of the plate 2. The proximal end 5 of the carrier 3 commences at a point preferably midway along the longitudinal axis of the plate 2 and is open ended. The distal end 6 of the carrier 3, which is closed, terminates at the distal end of the plate 2 and is provided with one or more holes 7 (see FIGS. 4A and 4B) to permit drainage of grease or oil that may be coated on a pull bar 4 following use thereof. Located at a point approximately midway along the longitudinal axis of the lateral wall of the carrier 3 and in direct alignment with the opposing wall (being the plate 2), are a pair of holes 8. The holes 8 have sufficient diameter to accommodate the insertion of a metal pin 9. Near the distal end of the pin 9 is an aperture 10 sized to cooperate with a padlock 11 such that, in combination, they constitute a locking means. The locking means, in use with the holster 1, functions as a security and safety device to hold a pull bar 4 in the holster 1 and prevent it from unauthorized removal, as well as possible maneuvering out of position when a truck is in transit. When not in use, the metal pin 9 is housed inside a cylindrical metal sleeve 12 which is attached to the exterior wall of the carrier 3. A chain 13, secured to both the metal sleeve 12 and pin 9, prevents the pin 9 from being inadvertently misplaced or lost when not in use.

Connected near the proximal end and on the same side of the plate 2 is a narrow rectangular collar 14 of similar width and height to the carrier 3. The collar 14 receives and supports the proximal end of a pull bar 4. A rubber grommet 15 lining the interior of the collar 14 conforms to the exterior profile of the pull bar 4. Therefore, the rubber grommet IS ensures that the position of the pull bar 4 is stabilized during storage and prevents it from vibrating in the holster 1 when a truck is in transit.

This particular embodiment of the invention allows the holster 1 to be mounted to a truck at a suitable angle of about 30 to 75°, preferably 45 to 60°, through the use of a flange 16. The flange 16 has a first portion 17 which is attached to and parallel with the upper wall of the carrier 3 near its open end, and a second portion 18, which extends obliquely towards the first portion 17. The second portion 18 has two holes 19 to allow for attachment of the holster to a support surface of a truck.

FIGS. 4A gives a cross-sectional view of a holster 1 with a release pull bar 4 as it is being inserted inside the holster 1. Within the internal cavity of the carrier 3 near its distal end 6 is mounted a pair of compressible wave springs 20, of similar width to the carrier and extending approximately one-half the entire length of the carrier 3. The wave springs 20 are mounted on mutually opposing lateral walls 21 of the carrier 3 with their convex surfaces facing inward. The more distal end of the wave spring 20 is secured in place by a pair of rivets 22 while the opposing end 23 of the wave spring 20, nearest the open end of the carrier 3, is left unattached or free to move whenever the spring 20 expands or contracts. When the driver inserts a release pull bar 4 through the open end 5 of the carrier 3, the distal end of the release pull bar 4 eventually begins to exert a downward compressive force on the wave springs 20 as the pull bar 4 moves in a forward direction. When the release pull bar 4 forcibly slides inside the holster 1, the free end 23 of each wave spring 20 begins to extend in length towards the proximal end 5 of the carrier 3 as a result of the downward compressive force exerted by the pull bar 4. Further compression and extension of the wave spring 20 yields a passageway which allows the distal end of a pull bar 4 to ultimately reach the extreme distal end 6 of the carrier 3. In this position, the hook-shaped member 24 of the pull bar 4 is sitting behind the convex curvature of both wave springs 20. When fully inserted inside the carrier 3, the release pull bar 4 is held firmly in place under constant compression exerted solely by the expansive force of the two wave springs 20. This operation is illustrated in FIG. 4B.

A release pull bar 4 can be easily removed from the holster 1 by pulling its handle 25 in a lateral and outward direction away from the collar 14 and carrier 3.

Figures 5, 6:
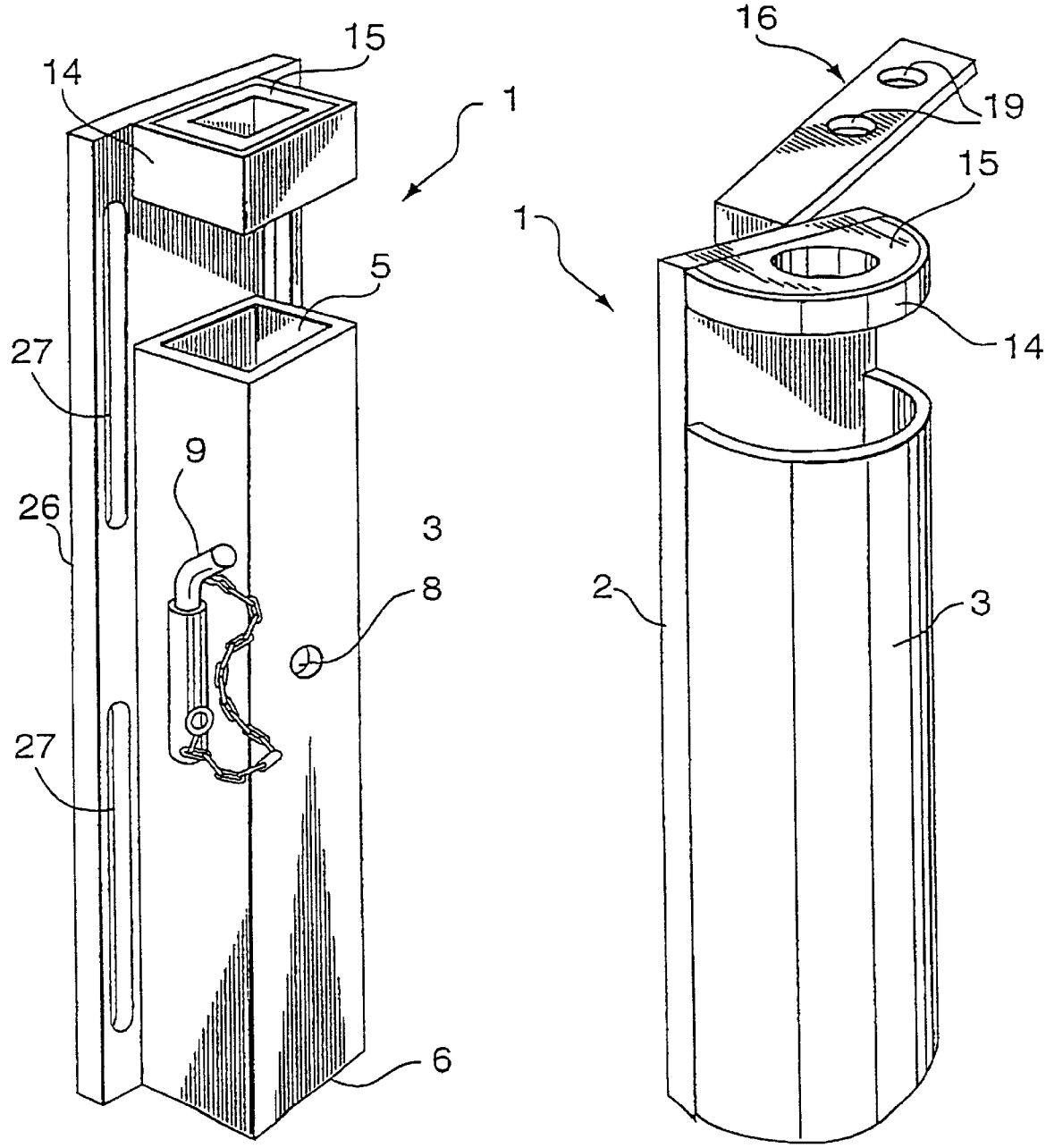
FIG. 5 shows a perspective view of a second embodiment of the release pull bar holster.
FIG. 6 shows a perspective view of a third embodiment of the release pull bar holster.

Another means of attachment of the holster 1 to a wall of the cab of a truck is illustrated in FIG. 5 in which the elongated plate 2 also serves as a universal mounting device 26 for the holster 1. Accordingly, the lateral width of the plate 2 extends equal distances beyond the anterior and posterior sides of the holster 1. The universal mounting device 26 has four elongated slots 27 in a plane parallel to the longitudinal axis of the plate 2, these slots 27 being equally positioned two to each side near the upper and lower edges of the device 26. The dimensions of the slots allow for suitable positioning and secured attachment of the holster 1 to a variety of support surfaces in the truck.

FIG. 6 illustrates a further embodiment of the invention in which the holster 1 is essentially of semi-cylindrical profile.

Figure 7A:
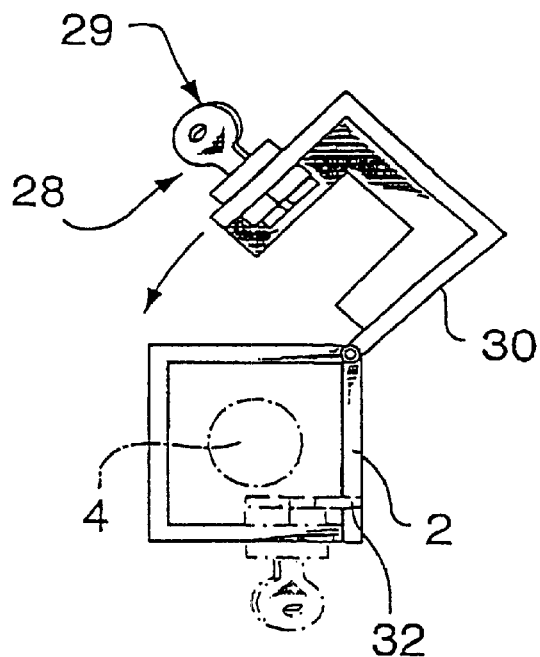
FIGS. 7A and 7B show a fourth embodiment of the release pull bar holster.
Figure 7B:
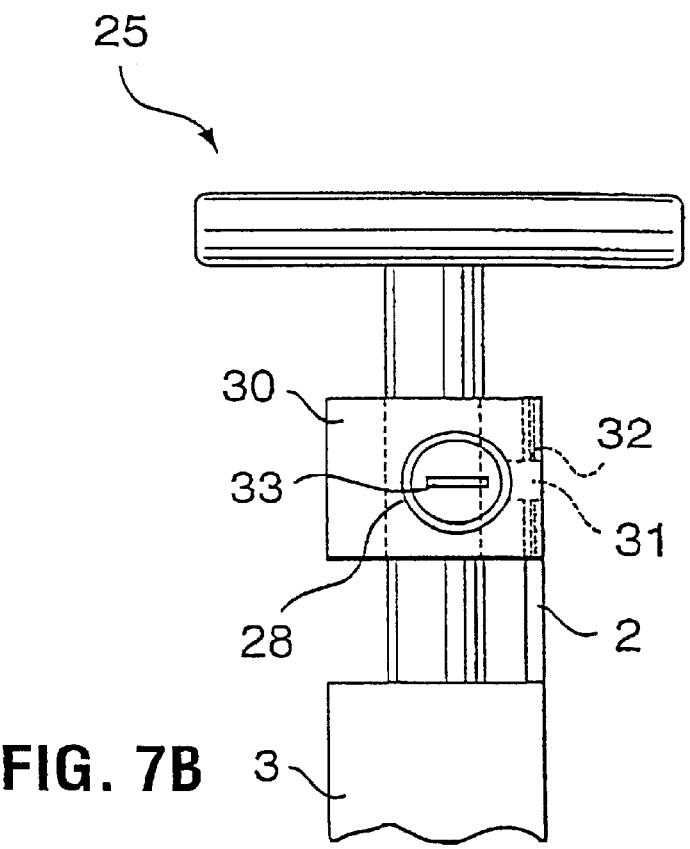

FIGS. 7A and 7B illustrate another means of passage for insertion and removal of the release pull bar 4 by the use of a hinged collar 30. The hinged collar 30 is pivotally attached near the proximal end of the plate 2 of the holster 1 and incorporates a security means comprising a lock assembly 28 and key 29. The hinged collar 30 may be positioned over the release pull bar 4 and locked in place to prevent access thereto. A locking arm 31, attached to the lock assembly 28, may occupy a groove 32 located inside the plate 2 when the collar 30 is positioned over the pull bar 4. The locking arm 31 may be rotated into the groove 32 by inserting and rotating the key 29 in the slot 33 of the lock assembly 28. When the locking arm 31 is positioned within the groove 32, the hinged collar 30 cannot be removed from its position and therefore secures the release pull bar 4 in the holster 1.

As previously mentioned, the release pull bar holster 1 can be manufactured in a variety of different shapes and sizes to suit the same purpose. Having illustrated and described the principles of the invention in preferred embodiments thereof, the invention is not limited to the specific details shown and can be modified in arrangement without departing from such principles or foregoing its primary advantages.

I claim:

1. A holster for storing a release pull bar for use in a transport truck, comprising in combination:
    (a) a hollow carrier member for receiving and supporting a release pull bar;
    (b) mounting means disposed on one side of the carrier member, said mounting means being adapted for attachment to a support surface of a transport truck;
    (c) securing means interior of the carrier member for supporting and stabilizing a release pull bar therein while the transport truck is in transit; and
    (d) collar means located near the proximal end of the holster for supporting the proximal end of a release pull bar.

2. A release pull bar holster according to claim 1, wherein a distal end of the carrier member includes one or more holes to allow for drainage of grease or oil that maybe coated on a release pull bar following use thereof.

3. A release pull bar holster according to claim 1, wherein the securing means comprises a pair of wave springs mounted on mutually opposed interior walls of the carrier member.

4. A release pull bar holster according to claim 1, wherein the interior of the collar means is lined with a resilient grommet to prevent a release pull bar from vibrating while the truck is in transit.

5. A release pull bar holster according to claim 1, further comprising a security device for firmly retaining the pull bar within the holster and preventing unauthorized removal thereof and possible maneuvering out of position when the truck is in transit.

6. A release pull bar holster according to claim 5, wherein the security device includes a pair of holes located in opposed lateral walls of the carrier member near the proximal end thereof, said holes accommodating a removable metal pin.

7. A release pull bar holster according to claim 6, wherein the metal pin has an aperture at its distal end sized to cooperate with a padlock and when used in combination with the holster, constitute a locking means for securing a pull bar in the holster.

8. A release pull bar holster according to claim 1, wherein said mounting means comprises a flange with a first portion connected to the holster and a second portion, with mounting holes, which extends obliquely with respect to the first portion.

9. A release pull bar holster according to claim 1, wherein said mounting means comprises an elongated plate secured to the rear of the carrier member and provided with universal mounting slots.

10. A release pull bar holster according to claim 9, wherein the elongated plate has four elongated slots in a plane parallel to the longitudinal axis of the plate and equally positioned two on each side near the upper and lower edges of the plate.

11. A release pull bar holster according to claim 1, wherein the collar means is pivotally attached to the holster and is positionable over the release pull bar thereby providing an alternative means of passage for insertion and removal of the release pull bar.

12. A release pull bar holster according to claim 11, wherein the collar means includes a locking means for securing the collar when positioned over the release pull bar and preventing unauthorized removal thereof.

* * * * *